Nov. 29, 1938.   O. H. MYERS   2,138,011
MULTIPLE ROW PLANTER.
Filed June 18, 1937   2 Sheets-Sheet 2

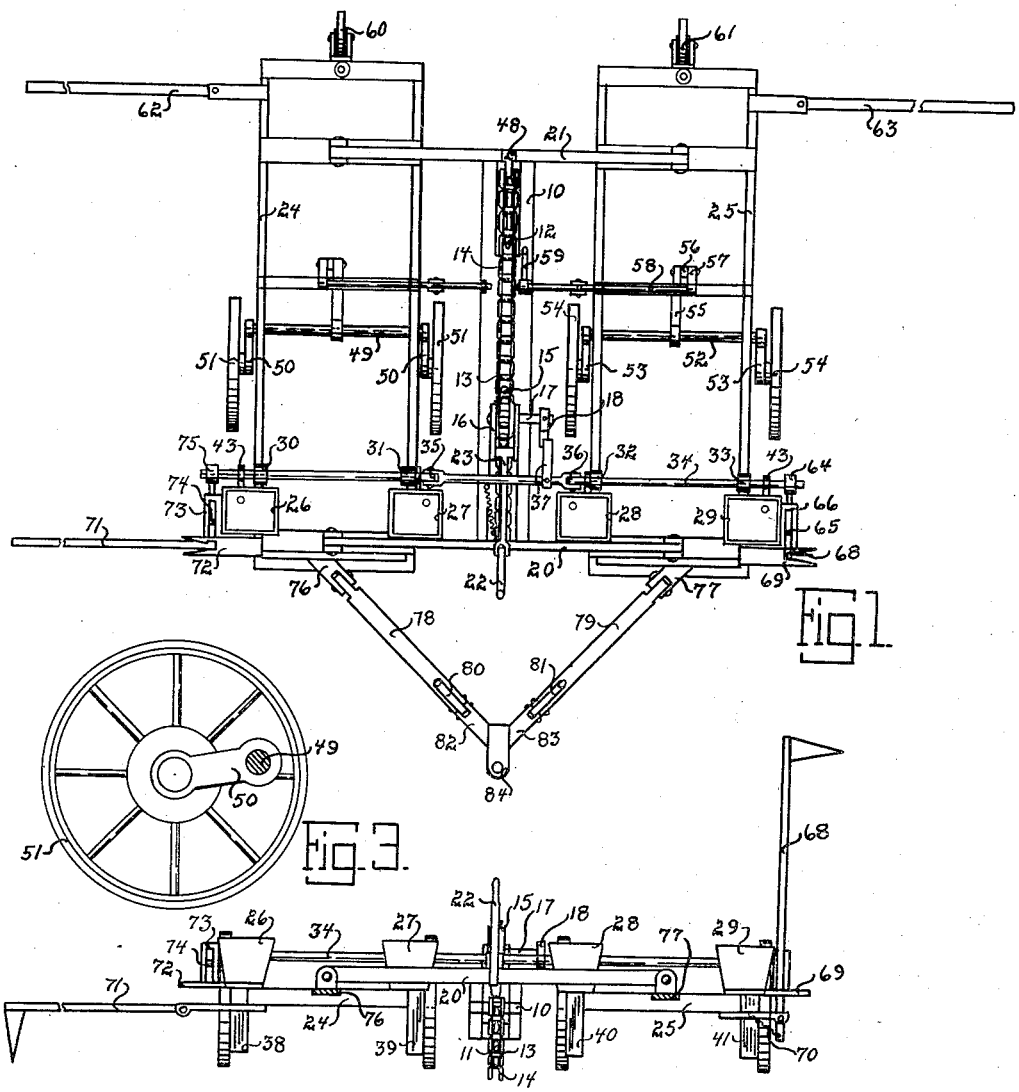

INVENTOR.
O. H. MYERS
BY Maurice J. Fletcher
ATTORNEY.

Patented Nov. 29, 1938

2,138,011

UNITED STATES PATENT OFFICE 2,138,011

MULTIPLE ROW PLANTER

Ola H. Myers, Central City, Iowa

Application June 18, 1937, Serial No. 148,918

5 Claims. (Cl. 111—19)

The principal object of my invention is to provide a multiple row planter that utilizes a full floating frame so that it will adapt itself to irregularities in ground contour.

A further object of this invention is to provide a planting machine that delivers the seeds to the ground at regular spaced intervals and that may be controlled as to the spacing of the seeds without the use of external spacing means such as a wire.

A still further object of my invention is to provide a four row planter whose operating mechanism may be manually raised from the ground so that it may be easily turned or conveyed from one side to another without operating the planting mechanism.

A still further object of this invention is to provide a multiple row planting machine that may be manually controlled and that automatically places its planting mechanism in a position for immediate planting of seeds at the desired point of starting of the planting row so that there will be no lag or cause of irregularity in the rows of planted seed.

A still further object of this invention is to provide a multiple row planter that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a top elevation view of my complete planter.

Fig. 2 is a front elevation view of my complete planting device ready for use.

Fig. 3 is an enlarged view of one of the wheels and cam supporting shafts of the device.

Fig. 4 is an enlarged elevation view of the mechanism for controlling the variance in length of the towing bar.

Figure 5:
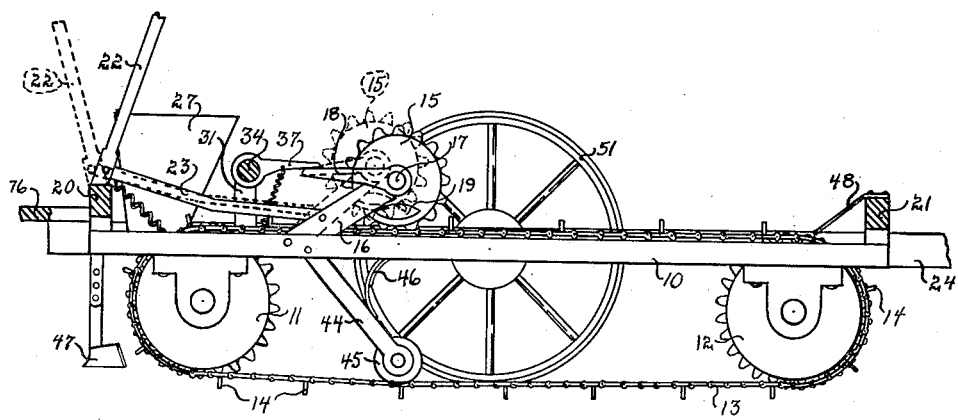
Fig. 5 is an enlarged side sectional view of the seed spacing mechanism.

It has always been a problem, in the planting of grain such as corn, to correctly space this planting of seeds so that the rows of grain when it matures will be straight and aligned in both directions. Heretofore this has been accomplished in a manner by the use of a wire stretched completely across the field and having knots thereon at spaced intervals. This method presents many disadvantages which are well known. The irregularity of the terrain prevents the even spacing of the planted seeds, it is a great deal of work to move this wire for every row of the grain planted and does not provide for the proper spacing of the planted grain when hollows or small knolls in the ground are encountered.

Several attempts have been made to create wireless corn planters but these devices have been subjected to a great amount of criticism due to their bulk, the inconsistency with which they plant grain, the difficulty of beginning the rows of planting in an exact spot and their utter lack of adaptability to uneven ground. I have overcome these disadvantages as will be appreciated and as hereinafter more fully set forth.

Referring to the drawings, I have used the numeral 10 to designate the longitudinal supporting frame of my device, having rotatably secured thereto the sprocket wheels 11 and 12. The numeral 13 designates an endless chain in operative engagement with the sprockets 11 and 12 having its upper travel over the supporting frame 10 and its lower travel on the earth. The numerals 14 designate lugs secured to the chain 13 for obtaining greater traction or drive on the chain when the device is pulled over the earth. The numeral 15 designates a sprocket wheel rotatably mounted above supporting frame 10 and, in a normal position of drive, being in engagement with the chain 13 and pivotally supported on the supporting frame 10 by the arms 16. This sprocket wheel 15 has a stub shaft 17 extending out through one of the arms 16 and has secured to its outer end a trip arm or lug 18. The numeral 19 indicates a weight on one side of the sprocket wheel 15 so that when the supporting arms 16 and the sprocket wheel are pivoted upwardly out of engagement with the chain, gravity will pull the weight 19 downwardly, placing the sprocket wheel 15 and lug 18 in a position where it will be ready for tripping, when the sprocket again engages the chain 13.

I have used the numerals 20 and 21 to designate transverse members secured on the upper side of the supporting frame 10 as shown in the drawings. Pivotally secured to the front cross member 20 is a lever 22 to which is pivotally secured one end of a link 23 which in turn has its other end pivotally secured to the arms 16 for manually raising the sprocket 15 out of engagement with the chain 13 at times. The numerals 24 and 25 designate two rectangular carrying frames which are pivoted near their longitudinal center-lines to each end of the transverse members 20 and 21. These frame members 24 and 25 are for the purpose of carrying seed hoppers 26, 27, 28 and 29 as shown in the drawings. Obviously, by pivoting these frame members 24 and 25 to the bars 20 and 21, they are able to accommodate a great variance in terrain contour, will be free floating and will support the seed hoppers 26, 27, 28 and 29 in spaced relationship to the earth over which the complete device is being pulled. Secured to the frame member 24 are the bearing members 30 and 31 and secured to the frame 25 are the bearing members 32 and 33 which rotatably support a shaft 34. This shaft has, near its central portion, the universal joints 35 and 36 so that the rotatable action of the rod will be uninterrupted regardless of the attitude or position of either the frame 24 or frame 25 relative to the transverse supporting members 20 and 21. Secured to the shaft 34 and positioned so that it will be actuated by the strip arm 18 is a trip bar 37. This trip bar has a tension spring secured to its under side and stretched to the frame 10 for holding the trip 37 in a normal position. The numerals 38, 39, 40 and 41 designate delivery chutes secured to and in communication with the hoppers 26, 27, 28 and 29 respectively. Within each of these chutes is a valve gate 42 which in turn is pivotally secured at its outer end to a link 43 which in turn is rigidly secured to the shaft 34. The numeral 44 designates an arm pivotally secured to and extending downwardly from the frame 10. Rotatably secured to the lower end of this arm 44 is a roller 45 for engaging the upper side of the chain on its lower travel for holding it in yielding contact with the earth. This pressure of the roller 45 is facilitated by the use of a spring 46 which normally holds the arm 44 and roller 45 in a downwardly position forcing the chain 13 with its attendant lugs 14 downwardly. Thus it will be seen that when the device is pulled in a forwardly direction the lugs 14 will contact the earth causing the chain 13 to travel about the sprockets 11 and 12 over the top of the frame 10, thereby actuating the sprocket 15. This in turn rotates the shaft 17 and the trip 18 so that at every revolution of the sprocket 15 the trip 18 will actuate the trip 37 causing the shaft 34 to rotate which in turn actuates the links 43, opens the gate valves 42 allowing a few kernels of grain to pass down the chutes 38, 39, 40 and 41 in the usual manner. As soon as the trip 37 has been actuated by the trip 18, the spring on the trip 37 will return the shaft 18 and its assembly to a normal position, closing the gate valves 42. Obviously, any number of trip levers may be placed on the shaft 17 for actuating the trip 37 as many times as is deemed necessary during the revolution of the sprocket 15. The numeral 47 designates an adjustable breaker secured to the frame 10 and extending down in front of the chain 13 for breaking or moving clods, rocks or other material from the path of the chain 13. The numeral 48 designates a cleaning arm secured to the center of the transverse member 21 and extending adjacent the chain 13 to clean out any accumulated dirt from between the lugs 14 as the chain 13 is actuated. The numeral 49 designates a shaft rotatably mounted through the frame 24 and having crank arms 50 secured to each of its outer ends as shown in Fig. 3 of the drawings. The numeral 51 designate wheels rotatably mounted on the other ends of the crank arms 50. Similarly, the numeral 52 designates a shaft rotatably mounted through the frame 25 and having secured to each of its outer ends the crank arms 53.

Figures 6, 7:
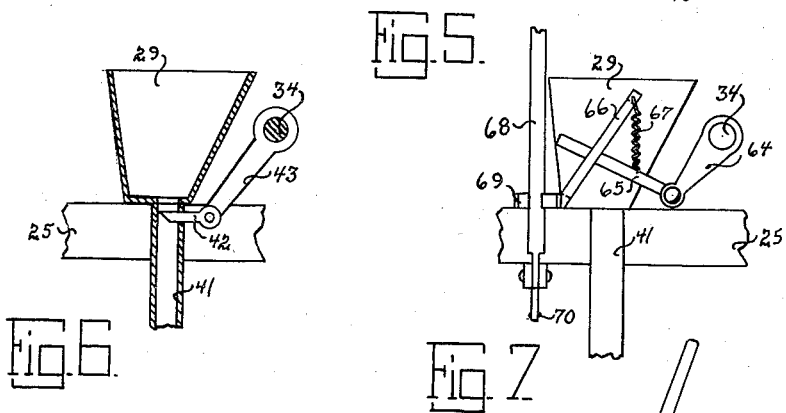
Fig. 6 is an enlarged side sectional view of one of the seed hoppers and its controlling device.
Fig. 7 is an enlarged side plan view of a portion of the device showing the marker actuator.
Figure 8:
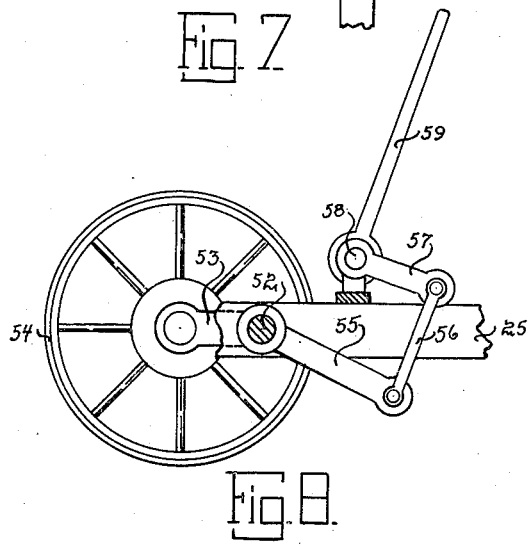
Fig. 8 is an enlarged side view of the supporting wheel adjusting mechanism.

On each of the other ends of the crank arms 53 are rotatably mounted the wheels 54 as shown in the drawings. Secured to each of the shafts 49 and 52 are the levers 55. These levers 55 have one of their ends secured to the shafts 49 and 52 and their other ends secured to one end of a link 56. This link in turn has its other end secured to an arm 57 which is rigidly secured to a shaft 58 as shown in the drawings. The shaft 58 is broken away near its center portion in the drawings in order to clarify the drawings and prevent confusion of lines. This shaft 58 is suitably journaled on the frames 24 and 25 and the supporting frame 10 having the usual universal joints to permit of flexibility within the shaft and is rigidly secured to a lever 59. Thus when the lever 59 is actuated, it rotates the shafts 49 and 52 through the arms 57 and 55, and the link 56, thus allowing the frames to be raised higher from the ground, thereby raising the device so that it rests on the two sets of wheels 51 and 54 to permit the easy towing of the complete assembly and to take care of changes in contour of the earth. The numerals 60 and 61 designate caster wheels secured to and supporting the rear portions of the frames 24 and 25 respectively. Pivotally secured to the outer side of the frame 24 near its rearward portion is an ordinary gauge rod 62 which may be swung into the frame when not in use and usually is controlled by a rope, cable or like in the ordinary manner. Similarly, the numeral 63 designates a gauge rod pivotally secured near the rearward portion of the frame 25 and extending outwardly therefrom. The numeral 64 designates an arm secured to one end of the shaft 34 to which is pivotally secured a trip rod 65 which extends through a slotted guide 66 and is held in a normal position by a coil spring 67 as shown in Fig. 7 of the drawings. The numeral 68 designates a marker of the usual design which is pivotally secured to an extension bracket that is secured to the frame 25 and which is held in an upright position by a clip 69. This clip 69 ordinarily holds the marker 68 in an upright position as shown in Fig. 2 of the drawings, but upon the rotation of the shaft 34 the trip bar 65 will at pre-determined times pushed the marker out of engagement with the clip 69, allowing it to drop to a horizontal position for marking in the usual manner. This marker is further assisted in dropping by the tension of a small coil spring 70 as shown in Fig. 2. Similarly, a marker 71 is pivotally secured to an extension bracket that is secured to the frame 24 and which is held in an upright position by a clip 72. Positioned to the rear of the clip 72 is a guide slot bar 73 which guides a trip bar 74 that is actuated by an arm 75 secured to the shaft 34, in a similar manner to that trip mechanism which actuates the marker 68. These markers, as is known, are pulled up by any type of means such as a cable or the like.

The numerals 76 and 77 designate two couplers secured to the forward ends of the frames 24 and 25 respectively and slanting forwardly and inwardly as shown in the drawings. Pivotally secured by one end to these couplers 76 and 77 are the bars 78 and 79. These bars 78 and 79 have slots cut in their other ends which are secured to lever bars 80 and 81 a distance above the lower end of the levers 80 and 81. Pivotally secured to the lower ends of the levers 80 and 81, in prolongation of the bars 78 and 79, are the bars 82 and 83 which are rigidly secured to a draw hitch 84 as shown in the drawings. Thus by manipulating the levers 80 and 81 either side of the towing mechanism can be lengthened or shortened to compensate for unevenness of ground or for side hills.

The practical operation of my device is as follows: A suitable motive power such as horses or a tractor is hitched to the draw hitch 84 and the hoppers 26, 27, 28 and 29 are filled with the seeds to be planted. The lever 22 will be in a position as shown by dotted lines in Fig. 5 as will be the sprocket 15.

The weight 19 will hold the sprocket 15 in such a position that when the lever 22 is pushed rearwardly allowing the sprocket 15 to engage the chain 13, the trip 18 will be in a position to immediately trip the trip bar 37 when it is desired to begin planting the seed. This will cause the gates 42 to be opened as herebefore explained depositing the seeds upon the ground. When the lever 22 is set in a position for tripping and the machine is ready to plant, the lever 59 is moved so that the two sets of wheels 51 and 54 are swung slightly upwardly to allow the chain 13 with its lugs 14 to contact the earth. Either the marker 68 or the marker 71 is tripped so as to be in a position such as the marker 71 is in Fig. 2 of the drawings for correctly marking the next row to be planted. The contact of the lugs 14 and chain 13 with the earth causes it to travel about the sprockets 11 and 12 in the usual manner actuating the sprocket 15 which trips the seeds in the usual manner at pre-determined spaces. It may be here mentioned that should it be desired to plant the seeds closer to one another, a multiple trip may be substituted for the trip arm 18. As the complete planting device is pulled over the ground, and irregularities are encountered such as a gully or depression, either the frame 24 or the frame 25 may pivot on the ends of the transverse members 20 and 21 so that the lower ends of the chutes 38, 39, 40 and 41 always remain in spaced relationship to the earth over which the device travels. In the event that the device is passing over the side of a small knoll and it is desired to keep the rows straight and even, the levers 80 and 81 may be actuated for shortening or lengthening either side of the tow bar assembly to compensate for the increased travel of the wheels on the upper side of the knoll. Upon turning the device around to begin a new set of rows, the lever 59 may be pulled forwardly, thus pivoting the wheels upon the crank arms 50 and 53 and raising the complete spacing mechanism from the ground so that it may be easily manipulated. At the same time the lever 22 is pulled forwardly, lifting the sprocket 15 from engagement with the chain which by virtue of the weight 19 will place the trip arm 18 in a position as shown in Fig. 5 of the drawings so that immediately upon the starting of planting, when the lever 22 is placed in its rearward position, the gate valves 42 will be opened to allow the required number of seeds to be deposited on the earth. This action takes place immediately and there is no lag so that the person planting the grain is assured of even rows of grain in the two directions necessary for the efficient cultivation of the grain during its primary stages. The chain 13 is held in contact with the ground by the roller 46 and, as the guard or breaker 47 smoothes the ground and removes clods from the head of the chain, the chain will have a constant rotation relative to the speed with which the planter is being drawn to assure accuracy in the planting. All unevenness of the contour of the ground is compensated for by the full floating frame, that is, the pivoted suspension of the frames 24 and 25 relative to the transverse members 20 and 21, and by manipulation of the levers 80 and 81 for increasing or decreasing the length of one side of the tow bar assembly. Also when the device is being towed from one place to another and it is not desired to plant grain, by actuating the lever 59, swinging the sets of wheels 51 and 54 downwardly, the device is easily conveyed from one spot to another without having to operate any of the mechanism upon the planter, thus making the device very easy to pull. My device is efficient in the use of planting all types of grain where it is desired to use any type of spacing whatsoever. Thus in the planting of corn, peanuts and in various types of truck farming, my device is of great utility as it may be used on any type of ground, is flexible in its operating characteristics, is highly mobile and is efficiently designed and constructed for great durability and strength.

Obviously, the various levers and markers may be controlled through cables, ropes or the like from the driver's seat of the tractor so as to centralize the control of the complete planting unit and this is the common practice in controlling this type of mechanism. It is also obvious that my type of construction is also adaptable to any number of rows and can be easily ganged to plant as many rows as is desired without encountering the difficulties heretofore encountered in multiple row planting.

I claim:

1. In a device of the class described, a supporting member, transverse members on said supporting member, frames hingedly secured to said transverse members on either side of said supporting member, wheels on said frames, seed hoppers on said frames, gate valve mechanisms on said hoppers, a shaft operatively secured to said valve mechanisms, a trip bar on said shaft, an endless chain operatively mounted on said supporting frame and designed to obtain traction from contact with the earth, a sprocket gear pivotally secured to said supporting member and rotatably suspended above said chain, a trip arm secured to said sprocket gear designed to engage said trip bar at times when said sprocket gear is in engagement with said chain, a means for manually pivoting said sprocket wheel out of engagement with said chain at times, and a weight on said sprocket gear for moving said sprocket gear to a pre-determined position when said sprocket gear is out of engagement with said chain.

2. In a device of the class described, a supporting member, transverse members on said supporting member, frames hingedly secured to said transverse members on either side of said supporting member, wheels on said frames, a means for manually raising or lowering said wheels relative to said frames, seed hoppers on said frames, gate valve mechanisms on said hoppers, a shaft operatively secured to said valve mechanisms, a trip bar on said shaft, an endless chain operatively mounted on said supporting frame and designed to obtain traction from contact with the earth, a sprocket gear pivotally secured to said supporting member and rotatably suspended above said chain, a trip arm secured to said sprocket gear designed to engage said trip bar at times when said sprocket gear is in engagement with said chain, a means for manually pivoting said sprocket wheel out of engagement with said chain at times, and a weight on said sprocket gear for moving said sprocket gear to a predetermined position when said sprocket gear is out of engagement with said chain.

3. In a planter, a supporting member, frame members hingedly secured to either side of said supporting member, a shaft in each of said frames, a crank arm on each end of said shafts, each crank arm having an end secured to an end of said shafts, wheels rotatably mounted on the other ends of said crank arms, a means for manually rotating said shafts for raising or lowering said wheels relative to said frames at times, seed hoppers secured to said frames, an endless chain operatively mounted on said supporting member designed to be in engagement with the earth for actuating said chain when the planter is being moved in a forwardly direction, valve mechanisms in said seed hoppers, a means for operatively connecting said valve mechanisms to said chain, and a means for manually disengaging said valve mechanisms from said chain at times.

4. In a device of the class described, a supporting member, transverse members on said supporting member, a frame hingedly secured to said transverse members adjacent said supporting member, wheels on said frame, a seed hopper on said frame, gate valve mechanism on said hopper, a shaft operatively secured to said valve mechanism, a trip bar on said shaft, an endless chain operatively mounted on said supporting frame designed to obtain traction from contact with the earth, a sprocket gear pivotally secured to said supporting member and rotatably suspended above said chain, a trip arm secured to said sprocket gear designed to engage said trip bar at times when said sprocket gear is in engagement with said chain, a means for manually pivoting said sprocket gear out of engagement with said chain at times, and a means for moving said sprocket gear to a pre-determined position of its rotation when said sprocket gear is out of engagement with said chain.

5. In a device of the class described, a supporting member, transverse members on said supporting member, frames hingedly secured to said transverse members on either side of said supporting member, wheels on said frames, a means for manually raising or lowering said wheels relative to said frames, seed hoppers on said frames, gate valves on said hoppers, a shaft operatively secured to said valve mechanism, an endless chain operatively mounted on said supporting frame and designed to obtain traction from contact with the earth, a sprocket gear pivotally secured to said supporting member and rotatably suspended above said chain, a trip arm secured to said sprocket gear and designed to operatively engage said shaft for operating said valve mechanism when said sprocket gear is in engagement with said chain, a means for manually pivoting said sprocket gear out of engagement with said chain at times, and a means for automatically rotating said sprocket gear to a pre-determined position when said sprocket gear is out of engagement with said chain.

OLA H. MYERS.